United States Patent
I Marques et al.

(10) Patent No.: US 12,512,217 B2
(45) Date of Patent: Dec. 30, 2025

(54) SYSTEM AND METHOD FOR DIGITIZING MEDICAL DEVICES AT A PATIENT TERMINAL

(71) Applicant: Doctomatic S.L., Barcelona (ES)

(72) Inventors: Frederic Llordachs I Marques, Barcelona (ES); Carmen Pauline Rios Benton, Barcelona (ES)

(73) Assignee: Doctomatic S.L., Barcelona (ES)

( * ) Notice: Subject to any disclaimer, the term of this patent is extended or adjusted under 35 U.S.C. 154(b) by 683 days.

(21) Appl. No.: 17/812,740

(22) Filed: Jul. 15, 2022

(65) Prior Publication Data
US 2024/0021302 A1     Jan. 18, 2024

(51) Int. Cl.
*G16H 40/63*    (2018.01)
*G06N 3/08*    (2023.01)
*G16H 15/00*    (2018.01)

(52) U.S. Cl.
CPC ............... *G16H 40/63* (2018.01); *G06N 3/08* (2013.01); *G16H 15/00* (2018.01)

(58) Field of Classification Search
None
See application file for complete search history.

(56) References Cited

U.S. PATENT DOCUMENTS

| | | | |
|---|---|---|---|
| 10,083,365 B2 | 9/2018 | Validic | |
| 2019/0050987 A1* | 2/2019 | Hsieh | G16H 30/40 |
| 2019/0216319 A1* | 7/2019 | Poeze | A61B 5/14546 |
| 2020/0405148 A1 | 12/2020 | Tran | |

(Continued)

FOREIGN PATENT DOCUMENTS

| | | | |
|---|---|---|---|
| IN | 202041050238 A | 11/2020 | |
| WO | WO-2020209596 A1 * | 10/2020 | H04L 63/0428 |

OTHER PUBLICATIONS

Cai et al., A Review of the Application of Deep Learning in Medical Image Classification and Segmentation, Annals of Translational Medicine (2020), https://doi.org/10.21037/atm.2020.02.44 (Year: 2020).*

(Continued)

*Primary Examiner* — Jonathon A. Szumny
*Assistant Examiner* — Nicholas Akogyeram, II
(74) *Attorney, Agent, or Firm* — Jason C. Cameron

(57) ABSTRACT

A system for digitizing medical devices at a patient terminal is disclosed. The system includes a processing subsystem which includes a device identification module which trains a first deep learning model, generates type-casted scanner clickables, enables scanning of the medical devices, receives multimedia of the medical devices, and identifies type of the medical devices. The processing subsystem also includes a verification module which receives a medical data transfer request and verifies an identity of a patient. The processing subsystem also includes a data determination module which trains a second deep learning model and determines data displayed on screen. The processing subsystem also includes a data interpretation module which trains a third deep learning model and interprets the data being medical data. The processing subsystem also includes a data transfer module which transfers the medical data to at least one of the healthcare providers and preferred recipients, thereby digitizing the medical devices.

16 Claims, 5 Drawing Sheets

(56) References Cited

U.S. PATENT DOCUMENTS

2021/0012906 A1\*  1/2021  Muhsin ................. G16H 10/60
2023/0123735 A1\*  4/2023  Major .................... G16H 40/20
                                                                   705/2

OTHER PUBLICATIONS

Scholar Space (Hawaii International Conference on System Sciences), The Application of Image Recognition and Machine Learning to Capture Readings of Traditional Blood Pressure Devices: A Platform to Promote Population Health Management to Prevent Cardiovascular Diseases, 2021.

\* cited by examiner

SYSTEM AND METHOD FOR DIGITIZING MEDICAL DEVICES AT A PATIENT TERMINAL

FIELD OF INVENTION

Embodiments of the present disclosure relate to the art of managing medical data, and more particularly, a system and a method for digitizing one or more medical devices at a patient terminal.

BACKGROUND

A medical device is any device intended to be used for medical purposes. Medical devices are used by patients to monitor health factors such as body temperature, blood sugar level, blood pressure, and so on. The readings acquired from the medical devices that match the health factors are expected to be shared with healthcare providers. Furthermore, the healthcare providers examine the patient's health characteristics and diagnose his or her ailment.

Conventionally, patients obtain paper notes of their medical data. They bring this piece of paper to their clinician/doctor after a few days. Manual data collecting on paper isn't ideal because of disadvantages such as delay in the time when the medical data reaches the doctor, the medical data is subject to fragility, and inefficiency. There are multiple approaches to overcome these disadvantages.

One such approach includes a system of connecting multiple medical devices via Bluetooth or a universal serial bus (USB) to download the medical data. However, a problem of fragility may still exist, because only the patient gets the medical data in this approach, and not the healthcare provider. The patient owns the data transfer, which he or she must send manually, electronically, or by other methods.

Hence, there is a need for an improved system and method for digitizing one or more medical devices at a patient terminal which addresses the aforementioned issue(s).

BRIEF DESCRIPTION

In accordance with an embodiment of the present disclosure, a system for digitizing one or more medical devices at a patient terminal is provided. The system includes a processing subsystem hosted on a server. The processing subsystem is configured to execute on a network to control bidirectional communications among a plurality of modules. The processing subsystem includes a device identification module. The device identification module is configured to train a first deep learning model with device identification-related data using one or more deep learning-based techniques in real-time. The device identification module is also configured to generate one or more type-casted scanner clickables corresponding to a type of each of the one or more medical devices, using the first deep learning model. Further, the device identification module is configured to enable scanning of the one or more medical devices via a scanning device by selecting the one or more type-casted scanner clickables by a patient, upon measurement of one or more health parameters using the one or more medical devices. The device identification module is further configured to receive one or more multimedia corresponding to the one or more medical devices upon scanning. Moreover, the device identification module is configured to identify the type of the one or more medical devices by analyzing the one or more multimedia using an object detection technique. The processing subsystem also includes a verification module operatively coupled to the device identification module. The verification module is configured to receive a medical data transfer request from the patient upon registration, upon identifying the type of the one or more medical devices. The verification module is also configured to verify an identity of the patient being authentic using a predefined verification technique in real-time upon receiving the medical data transfer request. Further, the processing subsystem also includes a data determination module operatively coupled to the verification module. The data determination module is configured to train a second deep learning model with data determination-related information using one or more deep learning-based techniques in real-time, upon verification of the identity of the patient and identifying the type of the one or more medical devices. The data determination module is also configured to determine data displayed on a screen of the one or more medical devices upon analyzing the one or more multimedia using an object detection technique and the second deep learning model. Furthermore, the processing subsystem also includes a data interpretation module operatively coupled to the data determination module. The data interpretation module is configured to train a third deep learning model with data interpretation-related information using one or more deep learning-based techniques in real-time, upon determining the data displayed on the screen of the one or more medical devices. The data interpretation module is also configured to interpret the data to be medical data corresponding to the one or more health parameters using the third deep learning model, based on at least one of the type of the one or more medical devices and predefined criteria. Moreover, the processing subsystem also includes a data transfer module operatively coupled to the data interpretation module. The data transfer module is configured to transfer the medical data to at least one of one or more healthcare providers and one or more preferred recipients based on the medical data transfer request, upon interpretation, thereby digitizing the one or more medical devices at the patient terminal for transferring the medical data.

In accordance with another embodiment of the present disclosure, a method for digitizing one or more medical devices at a patient terminal is provided. The method includes training a first deep learning model with device identification-related data using one or more deep learning-based techniques in real-time. The method also includes generating one or more type-casted scanner clickables corresponding to a type of each of the one or more medical devices, using the first deep learning model. The method further includes enabling scanning of the one or more medical devices via a scanning device by selecting the one or more type-casted scanner clickables by a patient, upon measurement of one or more health parameters using the one or more medical devices. Furthermore, the method also includes receiving one or more multimedia corresponding to the one or more medical devices upon scanning. Moreover, the method also includes identifying the type of the one or more medical devices by analyzing the one or more multimedia using an object detection technique. The method also includes receiving a medical data transfer request from the patient upon registration, upon identifying the type of the one or more medical devices. The method further includes verifying an identity of the patient being authentic using a predefined verification technique in real-time upon receiving the medical data transfer request. In addition, the method also includes training a second deep learning model with data determination-related information using one or more deep learning-based techniques in real-time, upon verification of the patient and identifying the type of the one or more medical devices. Subsequently, the method also includes determining data displayed on a screen of the one or more medical devices upon analyzing the one or more multimedia using an object detection technique and the second deep learning model. The method further includes training a third deep learning model with data interpretation-related information using one or more deep learning-based techniques in real-time, upon determining the data displayed on the screen of the one or more medical devices. Additionally, the method includes interpreting the data to be medical data corresponding to the one or more health parameters using the third deep learning model, based on at least one of the types of the one or more medical devices and predefined criteria. The method further includes transferring the medical data to at least one of one or more healthcare providers and one or more preferred recipients based on the medical data transfer request, upon interpretation, thereby digitizing the one or more medical devices at the patient terminal for transferring the medical data.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 4 (b) illustrates continued steps of the method of FIG. 4 (a) in accordance with an embodiment of the present disclosure.

Figure 1:
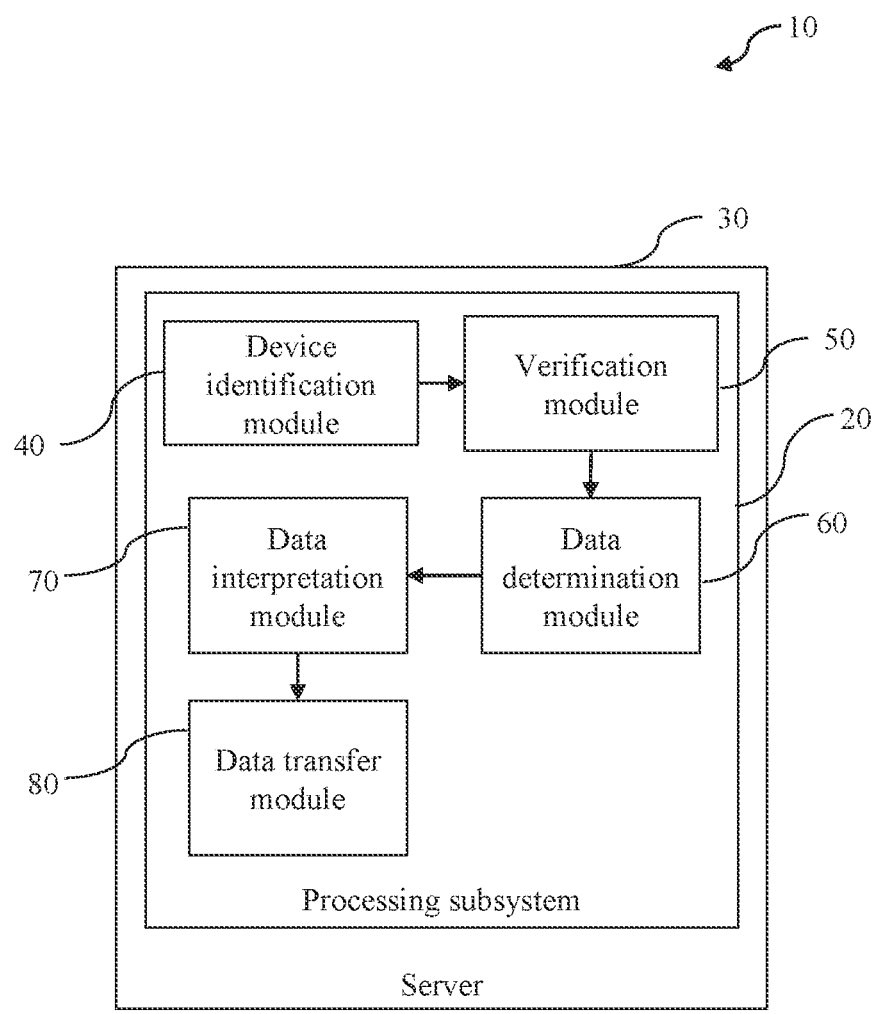
FIG. 1 is a block diagram representation of a system for digitizing one or more medical devices at a patient terminal in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise. Embodiments of the present disclosure relate to a system and a method for digitizing one or more medical devices at a patient terminal. As used herein, the term "medical device" is defined as any device intended to be used for medical purposes. A patient may use the one or more medical devices to measure one or more health parameters such as body temperature, blood sugar level, blood pressure, and the like. Once one or more readings corresponding to the one or more health parameters are taken from the corresponding one or more medical devices may have to be shared with one or more healthcare providers. Further, the one or more healthcare providers may analyze the corresponding one or more health parameters and diagnose a health condition of the patient. Therefore, the system described hereafter in FIG. 1 is the system for digitizing the one or more medical devices at the patient terminal for transferring medical data corresponding to the one or more health parameters to the one or more healthcare providers.

FIG. 1 is a block diagram representation of system 10 for digitizing one or more medical devices at a patient terminal in accordance with an embodiment of the present disclosure. The system 10 includes a processing subsystem 20 hosted on a server 30. In one embodiment, the server 30 may be a cloud-based server. In another embodiment, parts of the server 30 may be a local server coupled to a user device. The processing subsystem 20 is configured to execute on a network (not shown in FIG. 1) to control bidirectional communications among a plurality of modules. In one embodiment, the network may include one or more terrestrial and/or satellite networks interconnected to communicatively connect the user device to a web server engine. In one example, the network may be a private or public local area network (LAN) or Wide Area Network (WAN), such as the Internet. In another embodiment, the network may include both wired and wireless communications according to one or more standards and/or via one or more transport mediums. In one example, the network may include wireless communications according to one of the 802.11 or Bluetooth specification sets, or another standard or proprietary wireless communication protocol. In yet another embodiment, the network 60 may also include communications over a terrestrial cellular network, including, a global system for mobile communications GSM, code division multiple access CDMA, and/or enhanced data for global evolution EDGE network.

In one embodiment, the one or more medical devices may include a thermometer, a glucometer, a pulse oximeter, a spirometer, and the like. In one exemplary embodiment, the patient terminal may refer to at the end of the patient, in a patient device, or the like. In one embodiment, the patient device may include a mobile phone, a tablet, a laptop, or the like. Further, digitizing the one or more medical devices may refer to capturing one or more readings from the one or more medical devices using a camera, generating a digital document having the corresponding one or more readings captured.

Figure 2:
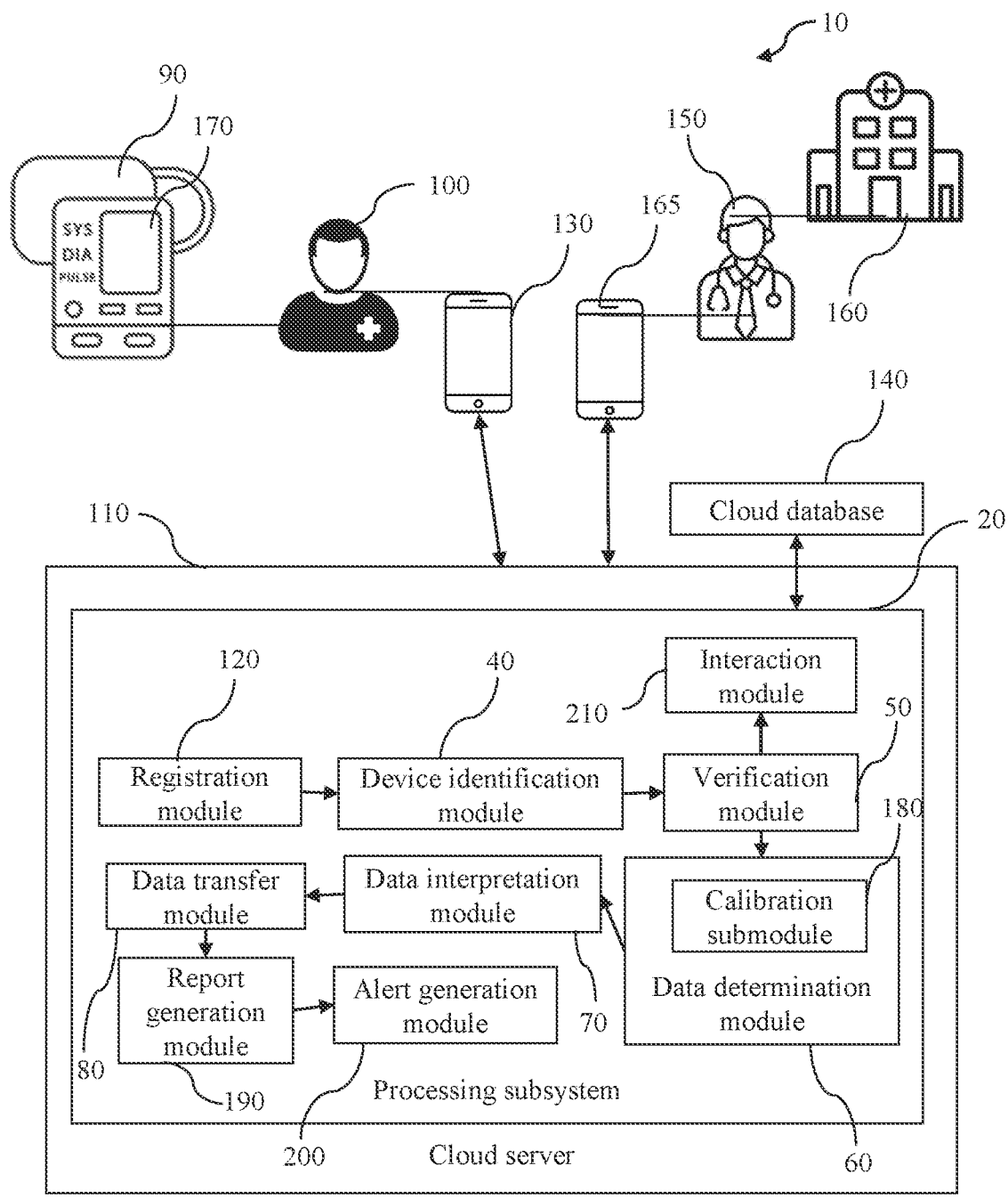
FIG. 2 is a block diagram representation of an exemplary embodiment of the system for digitizing one or more medical devices at a patient terminal of FIG. 1 in accordance with an embodiment of the present disclosure.

Basically, a patient may use the system 10 for digitizing the one or more medical devices. However, for the patient to be able to use the system 10, the patient may have to be registered with the system 10. Therefore, in an embodiment, the processing subsystem 20 may include a registration module (as shown in FIG. 2). The registration module may be configured to register the patient with the system 10 upon receiving a plurality of patient details via the patient device. The plurality of patient details may include at least one of a name, contact details, one or more login credentials, and the like corresponding to the patient. The plurality of patient details may be stored in a database associated with the system 10. In one exemplary embodiment, the database may be a local database or a cloud database.

Upon registration, the patient may then perform a measurement of one or more health parameters using the one or more medical devices. Further, for feeding medical data corresponding to the one or more health parameters, to the system 10, the patient may scan the corresponding one or more medical devices using a scanning device. In one embodiment, the scanning device may include the patient device integrated with a camera, a scanner, or the like. One or more multimedia obtained upon scanning, maybe then fed to the system 10. In one embodiment, the one or more multimedia may include one or more images, one or more videos, or the like. Upon receiving the one or more multimedia, the system 10 may have to be able to identify a type of the one or more medical devices, for the system 10 to be able to appropriately digitize the one or more medical devices. Therefore, the processing subsystem 20 includes a device identification module 40. The device identification module 40 is configured to train a first deep learning model with device identification-related data using one or more deep learning-based techniques in real-time.

As used herein, the term "deep learning" is defined as a type of machine learning (ML) based on artificial neural networks in which multiple layers of processing are used to extract progressively higher-level features from data. In one embodiment, the one or more deep learning-based techniques may include convolutional neural networks (CNN), recurrent neural networks (RNN), and the like. As used herein, the term "convolutional neural networks" is defined as a class of artificial neural networks, most commonly applied to analyze visual imagery. Similarly, as used herein, the term "recurrent neural networks" is defined as a class of artificial neural networks where connections between nodes form a directed or undirected graph along a temporal sequence.

Further, in an embodiment, the device identification-related data may include at least one of one or more multimedia, one or more device parameters, predefined information, and the like corresponding to a predefined set of the one or more medical devices. In one exemplary embodiment, the predefined set of the one or more medical devices may include a thermometer, a glucometer, a pulse oximeter, a spirometer, and the like. Therefore, in an embodiment, the one or more device parameters may correspond to one or more parameters corresponding to each of the one or more medical devices of the predefined set. For example, for the thermometer, the one or more device parameters may include a type of the corresponding thermometer, one or more types of thermometers, a unit of measurement, precision, accuracy, reproducibility, and the like. Further, in an embodiment, the predefined information may correspond to any additional information related to the corresponding one or more medical devices. For example, for the thermometer, the predefined information may correspond to one or more exceptions associated with the thermometer, one or more conditions preset for a usage of the thermometer, and the like.

Therefore, the first deep learning model may be generated, and then used by the system 10 for identifying the type of the one or more medical devices. Basically, the device identification module 40 is further configured to generate one or more type-casted scanner clickables corresponding to a type of each of the one or more medical devices, using the first deep learning model. As used herein, the term "type-casted scanner clickable" is defined as a clickable on a screen of a computing device that is type-casted with a certain type of a medical device. Basically, upon selecting or clicking on the one or more type-casted scanner clickables while scanning the one or more medical devices, the corresponding one or more medical devices can be identified by the system 10.

Therefore, the device identification module 40 is configured to enable scanning of the one or more medical devices via the scanning device by selecting the one or more type-casted scanner clickables by the patient, upon measurement of one or more health parameters using the one or more medical devices. The device identification module 40 is further configured to receive one or more multimedia corresponding to the one or more medical devices upon scanning. Moreover, the device identification module 40 is configured to identify the type of the one or more medical devices by analyzing the one or more multimedia using an object detection technique. As used herein, the term "object detection technique" is defined as a computer vision and image processing technique that allows a user to identify and locate objects in an image or video. In one exemplary embodiment, the type of the one or more medical devices identified by the system 10 may include the type stating the one or more medical devices may be a thermometer, a glucometer, a pulse oximeter, a spirometer, or the like. Therefore, the type may state a temperature measuring type device, a blood sugar level measuring type device, an oxygen level measuring type device, a color coding-related device, or the like.

Further, in one exemplary embodiment, the device identification module 40 may also be configured to detect a color-coding feature within the one or more medical devices using a color-coding detection technique, when the type identified corresponds to the color coding-related device.

For example, in the case of the spirometer having three balls that are color-coded for indicating different flow rates of air, detecting and understanding the color-coding becomes a requirement. Therefore, the device identification module 40 may be also configured to perform this operation as well. In one embodiment, the color-coding detection technique may include an image processing technique, an artificial intelligence AI-based technique, or the like. As used herein, the term "image processing" is defined as a method to perform some operations on an image, in order to get an enhanced image or to extract some useful information from it. Further, using the image processing technique for detecting color coding may include identifying pixels in an image that match a specified color or color range. Also, as used herein, the term "artificial intelligence" is defined as a theory and development of computer systems that can perform tasks that normally require human intelligence. Further, using the AI for detecting color may include identifying the color in an image with a range of values from 0 to 255, where each value indicates a color or a shade of a color.

Subsequently, upon capturing the medical data corresponding to the one or more health parameters, the medical data may have to be shared with one or more healthcare providers for further examination. However, prior to sharing the medical data, an identity of the patient may have to be verified, every time the patient requests for the sharing of the medical data with anyone. Therefore, the processing subsystem 20 also includes a verification module 50 operatively coupled to the device identification module 40. The verification module 50 is configured to receive a medical data transfer request from the patient upon registration, upon identifying the type of the one or more medical devices. The verification module 50 is also configured to verify the identity of the patient being authentic using a predefined verification technique in real-time upon receiving the medical data transfer request. In one embodiment, the predefined verification technique may include receiving one or more logic credentials from the patient, extracting pre-stored data personalized to the patient from the database, and comparing the one or more login credentials with the pre-stored data. Further, based on a comparison result obtained, the identity of the patient may be verified. In one exemplary embodiment, the pre-stored data may include the plurality of patient details, medical history, a plurality of relatives details, a plurality of friends details, and the like corresponding to the patient.

In one exemplary embodiment, the comparison result may include a positive comparison result or a negative comparison result. The positive comparison result may be generated when the one or more login credentials match with the pre-stored data, thereby verifying the identity of the patient to be authentic. The negative result may be generated when the one or more login credentials mismatch with pre-stored data, thereby failing to verify the identity of the patient to be authentic. Also, in an embodiment, the predefined verification technique may include a biometric verification technique. The biometric verification technique may be similar to the predefined verification technique with the one or more logic credentials being biometric such as, but not limited to, fingerprints, facial pattern, voice, iris pattern, or the like.

Upon verification and upon identification of the one or more medical devices, data measured by the corresponding one or more medical devices may have to be determined. Therefore, the processing subsystem 20 also includes a data determination module 60 operatively coupled to the verification module 50. The data determination module 60 is configured to train a second deep learning model with data determination-related information using one or more deep learning-based techniques in real-time, upon verification of the identity of the patient and identifying the type of the one or more medical devices.

In one embodiment, the one or more deep learning-based techniques may include a natural language processing NLP technique, an image processing technique, and the like. The one or more deep learning-based techniques basically may use the CNN, the RNN, and the like for processing data. Further, as used herein, the term "natural language processing" is defined as a technique that gives computers the ability to understand text and spoken words in much the same way human beings can. Further, in an embodiment, the data determination-related information may include at least one of a plurality of numerals with meaning, a plurality of alphanumeric characters with meaning, a plurality of symbols with meaning, and the like.

The data determination module 60 is also configured to determine the data displayed on a screen of the one or more medical devices upon analyzing the one or more multimedia using the object detection technique and the second deep learning model. Basically, in an embodiment, the data determination module 60 may include a calibration submodule (as shown in FIG. 2). The calibration submodule may be configured to generate a rectangular box to navigate and focus an area of interest for capturing the data in the one or more multimedia. The area of interest may correspond to the screen of the one or more medical devices. Thus, the screen may be navigated, and then the data on the screen may be determined.

Upon determining the data on the screen of the one or more medical devices, the data may have to be interpreted by the system 10. Therefore, the processing subsystem 20 also includes a data interpretation module 70 operatively coupled to the data determination module 60. The data interpretation module 70 is configured to train a third deep learning model with data interpretation-related information using one or more deep learning-based techniques in real-time, upon determining the data displayed on the screen of the one or more medical devices. In one embodiment, the one or more deep learning techniques may correspond to clustering, classification, arrangement, and the like of the data. Further, in an embodiment, the data interpretation-related information may include at least one of one or more multimedia corresponding to the one or more health parameters, the one or more health parameters, the one or more device parameters, a plurality of symbols with meaning, and the like. The plurality of symbols may refer to units corresponding to the measurements made using the one or more medical devices. The units may include degree Celsius, Kelvin, Fahrenheit, percent, milliliter, milligram, or the like.

The data interpretation module 70 is also configured to interpret the data to be the medical data corresponding to the one or more health parameters using the third deep learning model, based on at least one of the types of the one or more medical devices and predefined criteria. In one embodiment, the predefined criteria may include at least one of a scheme of arranging the data determined, proximity, a condition of considering at least two digits to be a whole single value together when the corresponding at least two digits may be closer than one half of a height of a smallest digit of the at least two digits, re-arranging based on the type of the one or more medical devices, and the like. In one exemplary embodiment, the scheme may include [[value, x, y, w, h]]. In such embodiment, the term 'value' refers to the value having the at least two digits displayed on the screen of the one or more medical devices. Similarly, the term 'x' refers to a position of one of the at least two digits on an X-axis or in a horizontal direction. Further, the term 'y' refers to a position of one of the at least two digits on a Y-axis or in a vertical direction. Furthermore, the term 'w' refers to a width of one of the at least two digits. The term 'h' refers to the height of one of the at least two digits.

Upon interpretation, the medical data may have to be transferred to people chosen by the patient. Therefore, the processing subsystem 20 also includes a data transfer module 80 operatively coupled to the data interpretation module 70. The data transfer module 80 is configured to transfer the medical data to at least one of the one or more healthcare providers and one or more preferred recipients based on the medical data transfer request, upon interpretation, thereby digitizing the one or more medical devices at the patient terminal for transferring the medical data. In an embodiment, the one or more healthcare providers may include one or more doctors, one or more physicians, one or more nurses, or the like. In one exemplary embodiment, the one or more preferred recipients may include one or more relatives, one or more friends, and the like corresponding to the patient.

Moreover, in an embodiment, all of the medical data that may be interpreted may be transferred based on the medical data transfer request for further processing of the medical data. Further, upon interpretation, the medical data may be updated in the database in real-time, as the database may be in synchronization with the collection and interpretation of the medical data. Furthermore, in an embodiment, the patient or the one or more healthcare providers may be willing to have a report having all details corresponding to a health condition of the patient. Therefore, the processing subsystem 20 may also include a report generation module (as shown in FIG. 2) operatively coupled to the data transfer module 80. The report generation module may be configured to generate a medical report personalized to the patient upon transferring the medical data. The medical report may include information corresponding to the one or more health parameters upon digitization of the medical data.

In addition, upon detection of an anomaly in the medical data, the patient or the one or more healthcare providers may have to be alerted so that preventive measures may be taken to improve the health condition of the patient. Therefore, the processing subsystem 20 may also include an alert generation module (as shown in FIG. 2). The alert generation module may be operatively coupled to the report generation module. The alert generation module may be configured to generate one or more alerts upon at least one of a detection of a deviation in the one or more health parameters from one or more threshold values, generation of the medical report, generation of a negative verification result, and the like. In one exemplary embodiment, the one or more alerts may be in one or more forms. The one or more forms may include a text message, an email, ringing an alarm, or the like.

Additionally, the patient may also be willing to interact with the one or more healthcare providers. Therefore, the processing subsystem 20 may include an interaction module (as shown in FIG. 2). The interaction module may be operatively coupled to the verification module 50. The interaction module may be configured to facilitate an interaction between the patient and at least one of the one or more healthcare providers and the one or more preferred recipients, upon receiving an interaction request, upon verification of the identity of the patient. Also, in an embodiment, the interaction request may be received from the patient. In another embodiment, the interaction request may be received from at least one of the one or more healthcare providers and the one or more preferred recipients. In one embodiment, the interaction may be in a chat form, an email form, or the like.

FIG. 2 is a block diagram representation of an exemplary embodiment of the system 10 for digitizing the one or more medical devices 90 at the patient terminal of FIG. 1 in accordance with an embodiment of the present disclosure. Considering a non-limiting example where the system 10 is used by a patient 'X' 100 for digitizing the one or more medical devices 90 at the patient terminal. Suppose the patient 'X' 100 is willing to check for the one or more health parameters such as blood pressure, then the one or more medical devices 90 will include a blood pressure monitor. The system 10 includes the processing subsystem 20 hosted on a cloud server 110. Further, the patient 'X' 100 registers with the system 10 via the registration module 120 upon providing a plurality of patient details via a patient's mobile phone 130. The plurality of patient details is stored in a cloud database 140.

Upon registration, the patient 'X' 100 starts to record measurements using the corresponding one or more medical devices 90. Upon recording, the patient 'X' 100 captures the measurements by scanning the one or more medical devices 90 using a camera of the patient's mobile phone 130. Basically, the scanning is enabled via the device identification module 40. Later, the one or more medical devices 90 are identified to be the blood pressure monitor via the device identification module 40, upon analyzing one or more images received upon scanning using the object detection technique and deep learning.

Further, the patient 'X' 100 requests for determining the data recorded by the one or more medical devices 90 and the transfer of the same to a doctor 'Y' 150 of a hospital 'Z' 160 on a doctor mobile phone 165, for the doctor 'Y' 150 to analyze a health condition of the patient 'X' 100. Upon receiving such a request, an identity of the patient 'X' 100 is verified via the verification module 50. Upon verification, the data is determined by the data determination module 60 using the object detection technique and deep learning. Ultimately, the data is interpreted via the data interpretation module 70, and then transferred to the doctor 'Y' 150 via the data transfer module 80.

Basically, for determining the data displayed on the screen 170 of the one or more medical devices 90, an area of interest which is the screen 170 is navigated and focused via the calibration submodule 180 using the object detection technique. Suppose the data determined includes values such as [[8, 130, 60, 20, 30], [5, 160, 60, 20, 30], [1, 100, 20, 20, 30], [2, 130, 20, 20, 30], [3, 160, 20, 20, 30], [8, 155, 100, 10, 20], [0, 170, 100, 10, 20], [2, 170, 130, 10, 20]], which is according to the scheme of arranged corresponding to [[value, x, y, w, h]]. The data determined is then received by the data interpretation module 70. First, the data interpretation module 70 will arrange digits found in groups depending on proximity. If 2 digits are closer than one-half of a height of a smallest digit, the data interpretation module 70 will be considered as one value together. For example, if the screen 170 displays a 1 and a 2 and those digits are 50 pixels (px) and 52px tall and a distance between them is 20px, then the digits displayed will be considered a 12 instead of a 1 and a 2, because 20px<25px. Once this step is done, the values with look like: [[85, 130, 60, 50, 30], [123, 100, 20, 80, 30], [80, 155, 100, 25, 20], [2, 170, 130, 10, 20]].

Now, in case the one or more medical devices 90 being read is the blood pressure monitor, the data interpretation module 70 will arrange the digits in, at least, 2 rows of digits ordered by h: a first row is systolic pressure, a second row is diastolic pressure. In case of having more digits under the second row, it will be returned as a Pulse. If there are more digits underneath, they will be ignored. Therefore, the values will initially look like: [[123, 100, 20, 80, 30], [85, 130, 60, 50, 30], [80, 155, 100, 25, 20], [2, 170, 130, 10, 20]], and then like: {"sys": 123, "dia": 85, "pulse": 80}. The last row of [2, 170, 130, 10, 20] will be ignored. In the case of the one or more medical devices 90 being read is a scale, a thermometer, or a glucometer, the data interpretation module 70 will do the same process but using only one row. In the case of the one or more medical devices 90 being read is a pulse oximeter, the data interpretation module 70 will do the same process but using only two rows.

Moreover, a personalized medical report having the values read is also generated via the report generation module 190. Further, an alert will also be generated for the doctor 'Y' 150 via the alert generation module 200, if a deviation in the values from threshold values is detected. Based on the deviation detected the doctor 'Y' 150 may be willing to communicate with the patient 'X' 100, then the same can be carried out via a chat feature of the system 10, that is, via the interaction module 210. Thus, this is how the digitizing of the one or more medical devices 90 at the patient terminal is carried out for transferring the medical data to the doctor 'Y' 150 in real-time.

Figure 3:
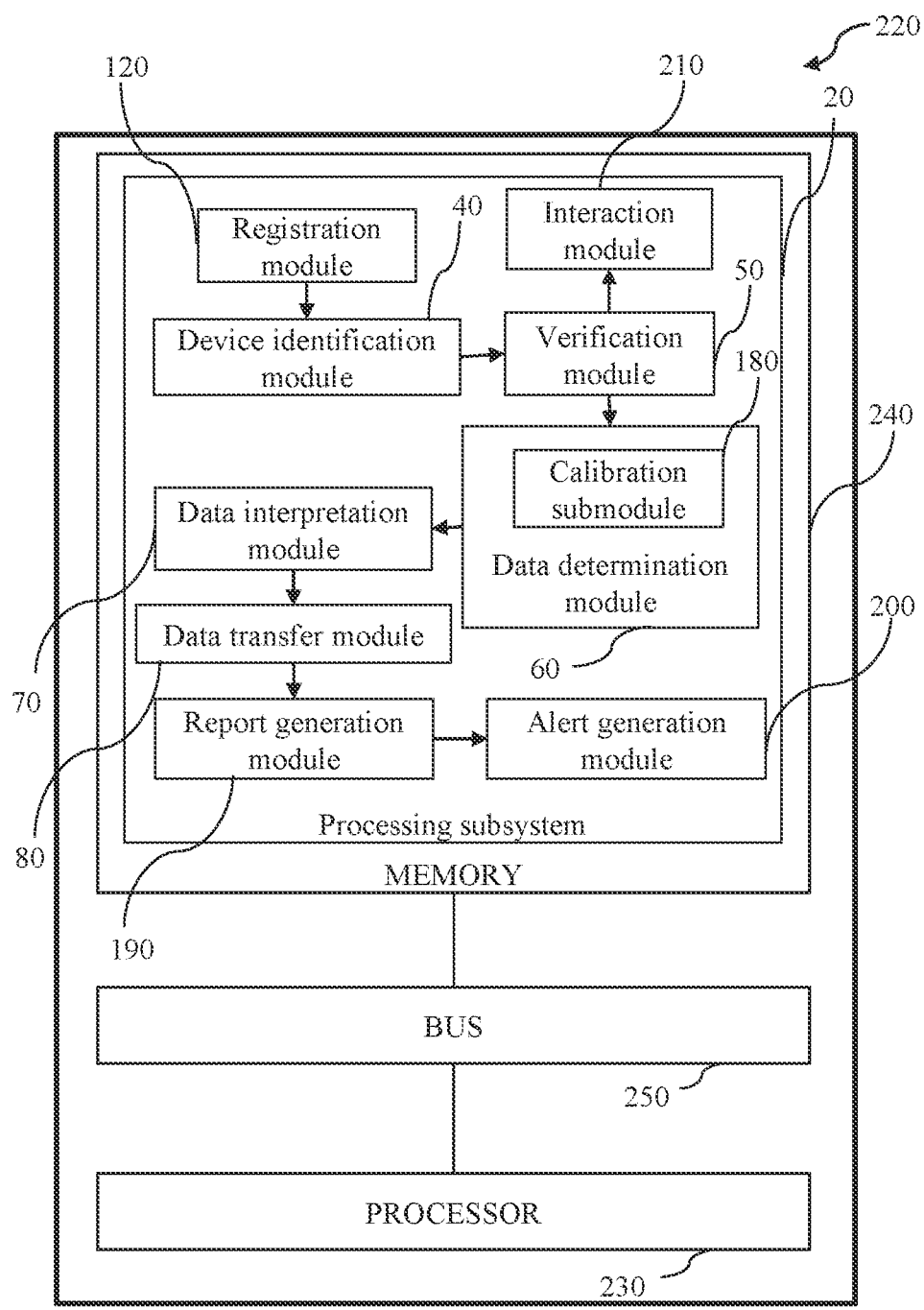
FIG. 3 is a block diagram of a medical data digitizing computer or a medical data digitizing server in accordance with an embodiment of the present disclosure.

FIG. 3 is a block diagram of a medical data digitizing computer or a medical data digitizing server 220 in accordance with an embodiment of the present disclosure. The medical data digitizing server 220 includes processor(s) 230, and memory 240 operatively coupled to the bus 250.

The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 240 includes a plurality of subsystems and a plurality of modules stored in the form of an executable program which instructs the processor(s) 230 to perform the method steps illustrated in FIG. 1. The memory 240 is substantially similar to the system 10 of FIG. 1. The memory 240 has the following subsystems: a processing subsystem 20 including a device identification module 40, a verification module 50, a data determination module 60, a data interpretation module 70, a data transfer module 80, a report generation module 190, an alert generation module 200, and an interaction module 210.

The processing subsystem 20 includes a device identification module 40 configured to train a first deep learning model with device identification-related data using one or more deep learning-based techniques in real-time. The device identification module 40 is also configured to generate one or more type-casted scanner clickables corresponding to a type of each of the one or more medical devices 90, using the first deep learning model. The device identification module 40 is further configured to enable scanning of the one or more medical devices 90 via a scanning device by selecting the one or more type-casted scanner clickables by a patient, upon measurement of one or more health parameters using the one or more medical devices 90. The device identification module 40 is also configured to receive one or more multimedia corresponding to the one or more medical devices 90 upon scanning. Moreover, the device identification module 40 is configured to identify the type of the one or more medical devices 90 by analyzing the one or more multimedia using an object detection technique.

The processing subsystem 20 also includes a verification module 50 configured to receive a medical data transfer request from the patient upon registration, upon identifying the type of the one or more medical devices 90. The verification module 50 is also configured to verify an identity of the patient being authentic using a predefined verification technique in real-time upon receiving the medical data transfer request.

The processing subsystem 20 further includes a data determination module 60 configured to train a second deep learning model with data determination-related information using one or more deep learning-based techniques in real-time, upon verification of the identity of the patient and identifying the type of the one or more medical devices 90. The data determination module 60 is also configured to determine data displayed on a screen 170 of the one or more medical devices 90 upon analyzing the one or more multimedia using an object detection technique and the second deep learning model. The data determination module 60 includes a calibration submodule configured to generate a rectangular box to navigate and focus an area of interest for capturing the data in the one or more multimedia, wherein the area of interest corresponds to the screen 170 of the one or more medical devices 90.

The processing subsystem 20 further includes a data interpretation module 70 configured to train a third deep learning model with data interpretation-related information using one or more deep learning-based techniques in real-time, upon determining the data displayed on the screen 170 of the one or more medical devices 90. The data interpretation module 70 is also configured to interpret the data to be medical data corresponding to the one or more health parameters using the third deep learning model, based on at least one of the type of the one or more medical devices 90 and predefined criteria.

The processing subsystem 20 further includes a data transfer module 80 configured to transfer the medical data to at least one of one or more healthcare providers and one or more preferred recipients based on the medical data transfer request, upon interpretation, thereby digitizing the one or more medical devices 90 at the patient terminal for transferring the medical data.

The processing subsystem 20 includes a report generation module 190 configured to generate a medical report personalized to the patient upon transferring the medical data, wherein the medical report comprises information corresponding to the one or more health parameters upon digitization of the medical data.

The processing subsystem 20 further includes an alert generation module 200 configured to generate one or more alerts upon at least one of a detection of a deviation in the one or more health parameters from one or more threshold values, generation of the medical report, and generation of a negative verification result.

The processing subsystem 20 includes an interaction module 210 configured to facilitate an interaction between the patient and at least one of the one or more healthcare providers and the one or more preferred recipients, upon receiving an interaction request, upon verification of the identity of the patient.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 240.

Figure 4:
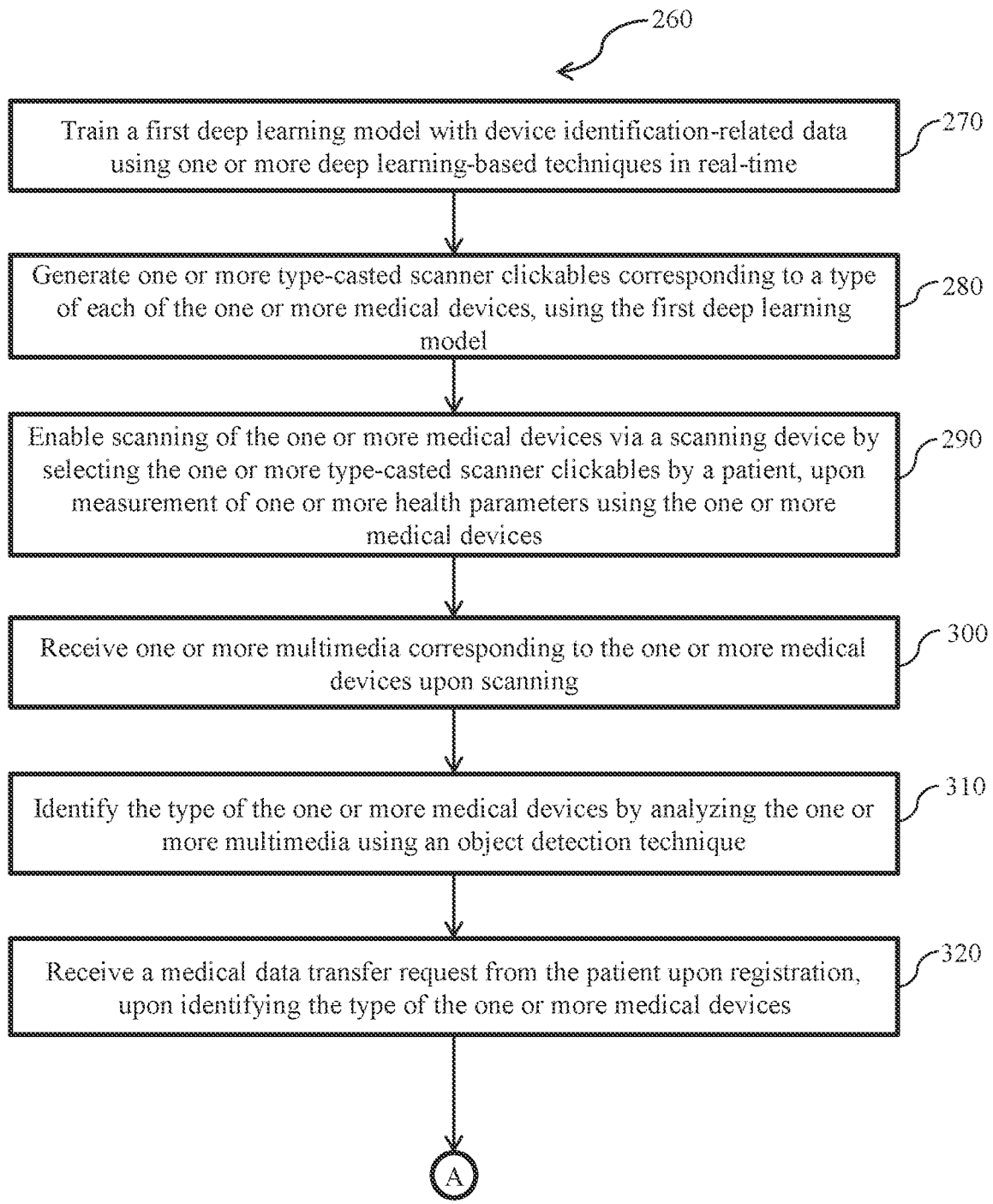
FIG. 4 (a) illustrates a flow chart representing the steps involved in a method for digitizing one or more medical devices at a patient terminal in accordance with an embodiment of the present disclosure.
Figure 4:
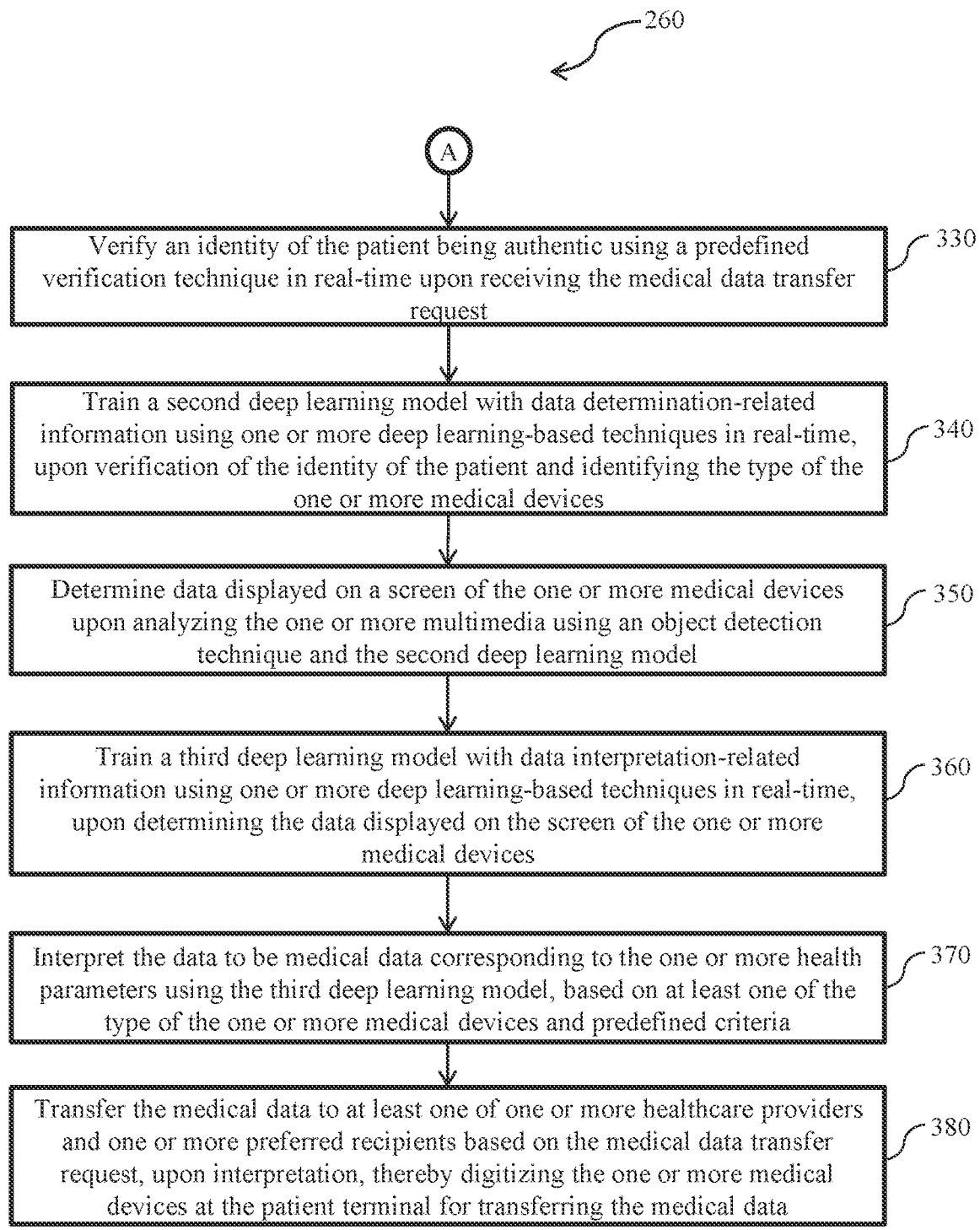

FIG. 4 (*a*) illustrates a flow chart representing the steps involved in a method 260 digitizing one or more medical devices at a patient terminal in accordance with an embodiment of the present disclosure. FIG. 4 (*b*) illustrates continued steps of the method 260 of FIG. 4 (*a*) in accordance with an embodiment of the present disclosure. The method 260 includes training a first deep learning model with device identification-related data using one or more deep learning-based techniques in real-time in step 270. In one embodiment, training the first deep learning model may include training the first deep learning model via a device identification module 40.

The method 260 also includes generating one or more type-casted scanner clickables corresponding to a type of each of the one or more medical devices, using the first deep learning model in step 280. In one embodiment, generating the one or more type-casted scanner clickables may include generating the one or more type-casted scanner clickables via the device identification module 40.

The method 260 further includes enabling scanning of the one or more medical devices via a scanning device by selecting the one or more type-casted scanner clickables by a patient, upon measurement of one or more health parameters using the one or more medical devices in step 290. In one embodiment, enabling scanning of the one or more medical devices may include enabling scanning of the one or more medical devices via the device identification module 40.

Furthermore, the method 260 also includes receiving one or more multimedia corresponding to the one or more medical devices upon scanning in step 300. In one embodiment, receiving the one or more multimedia may include receiving the one or more multimedia via the device identification module 40.

Moreover, the method 260 also includes identifying the type of the one or more medical devices by analyzing the one or more multimedia using an object detection technique in step 310. In one embodiment, identifying the type of the one or more medical devices may include identifying the type of the one or more medical devices via the device identification module 40.

The method 260 also includes receiving a medical data transfer request from the patient upon registration, upon identifying the type of the one or more medical devices in step 320. In one embodiment, receiving the medical data transfer request may include receiving the medical data transfer request via a verification module 50.

The method 260 further includes verifying an identity of the patient being authentic using a predefined verification technique in real-time upon receiving the medical data transfer request in step 330. In one embodiment, verifying the identity of the patient may include verifying the identity of the patient via the verification module 50.

In addition, the method 260 also includes training a second deep learning model with data determination-related information using one or more deep learning-based techniques in real-time, upon verification of the patient and identifying the type of the one or more medical devices in step 340. In one embodiment, training the second deep learning model may include training the second deep learning model via a data determination module 60.

Subsequently, the method 260 also includes determining data displayed on a screen of the one or more medical devices upon analyzing the one or more multimedia using an object detection technique and the second deep learning model in step 350. In one embodiment, determining the data may include determining the data via the data determination module 60.

The method 260 further includes training a third deep learning model with data interpretation-related information using one or more deep learning-based techniques in real-time, upon determining the data displayed on the screen of the one or more medical devices in step 360. In one embodiment, training the third deep learning model may include training the third deep learning model via a data interpretation module 70.

Additionally, the method 260 includes interpreting the data to be medical data corresponding to the one or more health parameters using the third deep learning model, based on at least one of the type of the one or more medical devices and predefined criteria in step 370. In one embodiment, interpreting the data to be the medical data may include interpreting the data to be the medical data via the data interpretation module 70.

The method 260 further includes transferring the medical data to at least one of one or more healthcare providers and one or more preferred recipients based on the medical data transfer request, upon interpretation, thereby digitizing the one or more medical devices at the patient terminal for transferring the medical data in step 380. In one embodiment, transferring the medical data may include transferring the medical data via a data transfer module 80.

In one exemplary embodiment, the method 260 may further include detecting a color-coding feature within the one or more medical devices using a color-coding detection technique, when the type identified corresponds to a color coding-related device. In such embodiment, detecting the color-coding feature may include detecting the color-coding feature via a device identification module 40.

Further, in one embodiment, the method 260 may also include generating a rectangular box to navigate and focus an area of interest for capturing the data in the one or more multimedia, wherein the area of interest corresponds to the screen of the one or more medical devices. In such an embodiment, generating the rectangular box may include generating the rectangular box via a data determination module 60.

Furthermore, in one exemplary embodiment, the method 260 may include generating a medical report personalized to the patient upon transferring the medical data, wherein the medical report comprises information corresponding to the one or more health parameters upon digitization of the medical data. In such an embodiment, generating the medical report may include generating the medical report via a report generation module 190.

In one embodiment, the method 260 may further include generating one or more alerts upon at least one of a detection of a deviation in the one or more health parameters from one or more threshold values, generation of the medical report, and generation of a negative verification result. In such an embodiment, generating the one or more alerts may include generating the one or more alerts via an alert generation module 200.

Various embodiments of the system and method for digitizing the one or more medical devices at the patient terminal as described above enables collecting and reading data from any medical device having a liquid crystal display LCD that presents numerical data and sends the data to a medical team in real-time with data analytics.

Along with the feature of enabling the one or more healthcare providers to view the medical data of the patient, the system also enables the one or more healthcare providers to activate a patient's account and set parameters and frequency of data capturing, thereby making the system more flexible to use and more efficient.

Further, as the medical data is shared instantly with the one or more healthcare providers, one or more alerts are also generated upon detection of an anomaly in the medical data, thereby making the system more efficient and more reliable.

The system may help to decrease network traffic associated with one or more e-commerce transactions by transitioning from the server to the sub-processing module of the user device such as a browser. In this way, a user may still be able to access the website during periods of high network traffic but may be presented with a different checkout procedure when completing an e-commerce transaction thereby increasing usability of the website and customer satisfaction during periods of high network traffic. Accordingly, the techniques may increase sales throughput via the website and improve customer satisfaction.

The techniques described in this disclosure may be implemented, at least in part, in hardware, software, firmware, or any combination thereof. For example, various aspects of the described techniques may be implemented within one or more processors, including one or more microprocessors, digital signal processors DSPs, application-specific integrated circuits ASICs, field-programmable gate arrays FPGAs, or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for digitizing one or more medical devices at a patient terminal comprising:

a processor; and a memory coupled to the processor, wherein the memory comprises a set of program instructions in the form of a processing subsystem, configured to be executed by the processor, wherein the processing subsystem is hosted on a server, and configured to execute on a network to control bidirectional communications among a plurality of modules comprising:

a device identification module configured to:

train a first deep learning model with device identification-related data using one or more deep learning-based techniques in real-time;

generate one or more type-casted scanner clickables corresponding to a type of each of the one or more medical devices, using the first deep learning model;

enable scanning of the one or more medical devices via a scanning device by selecting the one or more type-casted scanner clickables by a patient, upon measurement of one or more health parameters using the one or more medical devices;

receive one or more multimedia corresponding to the one or more medical devices upon scanning; and identify the type of the one or more medical devices by analyzing the one or more multimedia using an object detection technique;

a verification module operatively coupled to the device identification module, wherein the verification module is configured to:

receive a medical data transfer request from the patient upon registration, upon identifying the type of the one or more medical devices; and verify an identity of the patient being authentic using a predefined verification technique in real-time upon receiving the medical data transfer request;

a data determination module operatively coupled to the verification module, wherein the data determination module is configured to:

train a second deep learning model with data determination-related information using one or more deep learning-based techniques in real-time, upon verification of the identity of the patient and identifying the type of the one or more medical devices;

determine data displayed on a screen of the one or more medical devices upon analyzing the one or more multimedia using an object detection technique and the second deep learning model; and generate a coordinate-based representation of each detected element in a form of a tuple [value, x, y, w, h], wherein the value represents a digit or symbol, the x and y represent pixel coordinates of a location of the digit or symbol on the screen, and the w and h represent a width and a height of a bounding box of the digit or symbol in pixels;

a data interpretation module operatively coupled to the data determination module, wherein the data interpretation module is configured to:
    train a third deep learning model with data interpretation-related information using one or more deep learning-based techniques in real-time, upon receiving the coordinate-based representation of the each detected element from the data determination module;
    group the detected digits into composite values based on spatial positions defined by the pixel coordinates, wherein if a distance between two detected digits is less than one-half of the height h of a smallest detected digit, the two detected digits are treated as a single composite value, and digits not satisfying remain as individual values;
    generate updated coordinate-based representations of the composite values by adjusting the bounding boxes to reflect any merging;
    arrange the composite values into one or more rows based on their vertical pixel coordinates y; and
    interpret the arranged one or more rows as medical data corresponding to one or more health parameters using the third deep learning model, based on at least one of the type of the one or more medical devices; and a data transfer module operatively coupled to the data interpretation module, wherein the data transfer module is configured to transfer the medical data to at least one of one or more healthcare providers and one or more preferred recipients based on the medical data transfer request, upon interpretation, thereby digitizing the one or more medical devices at the patient terminal for transferring the medical data.

2. The system of claim 1, wherein the device identification-related data comprises at least one of one or more multimedia, one or more device parameters, and predefined information corresponding to a predefined set of the one or more medical devices.

3. The system of claim 1, wherein the data determination-related information comprises at least one of a plurality of numerals with meaning, a plurality of alphanumeric characters with meaning, and a plurality of symbols with meaning.

4. The system of claim 1, wherein the data interpretation-related information comprises at least one of one or more multimedia corresponding to one or more health parameters, one or more health parameters, one or more device parameters, and a plurality of symbols with meaning.

5. The system of claim 1, wherein the predefined verification technique comprises a biometric verification technique.

6. The system of claim 1, wherein the device identification module is configured to detect a color-coding feature within the one or more medical devices using a color-coding detection technique, when the type identified corresponds to a color coding-related device.

7. The system of claim 1, wherein the data determination module comprises a calibration submodule configured to generate a rectangular box to navigate and focus an area of interest for capturing the data in the one or more multimedia, wherein the area of interest corresponds to the screen of the one or more medical devices.

8. The system of claim 1, wherein the processing subsystem comprises a report generation module operatively coupled to the data transfer module, wherein the report generation module is configured to generate a medical report personalized to the patient upon transferring the medical data, wherein the medical report comprises information corresponding to the one or more health parameters upon digitization of the medical data.

9. The system of claim 8, wherein the processing subsystem comprises an alert generation module operatively coupled to the report generation module, wherein the alert generation module is configured to generate one or more alerts upon at least one of a detection of a deviation in the one or more health parameters from one or more threshold values, generation of the medical report, and generation of a negative verification result.

10. The system of claim 1, wherein the processing subsystem comprises an interaction module operatively coupled to the verification module, wherein the interaction module is configured to facilitate an interaction between the patient and at least one of the one or more healthcare providers and the one or more preferred recipients, upon receiving an interaction request, upon verification of the identity of the patient.

11. A method for digitizing one or more medical devices at a patient terminal, performed by a system comprising a processor and an associated memory, the method comprising:
    training, by the processor, a first deep learning model with device identification-related data using one or more deep learning-based techniques in real-time;
    generating, by the processor, one or more type-casted scanner clickables corresponding to a type of each of the one or more medical devices, using the first deep learning model;
    enabling, by the processor, scanning of the one or more medical devices via a scanning device by selecting the one or more type-casted scanner clickables by a patient, upon measurement of one or more health parameters using the one or more medical devices;
    receiving, by the processor, one or more multimedia corresponding to the one or more medical devices upon scanning;
    identifying, by the processor, the type of the one or more medical devices by analyzing the one or more multimedia using an object detection technique;
    receiving, by the processor, a medical data transfer request from the patient upon registration, upon identifying the type of the one or more medical devices;
    verifying, by the processor, an identity of the patient being authentic using a predefined verification technique in real-time upon receiving the medical data transfer request;
    training, by the processor, a second deep learning model with data determination-related information using one or more deep learning-based techniques in real-time, upon verification of the patient and identifying the type of the one or more medical devices;
    training, by the processor, a second deep learning model with data determination-related information using one or more deep learning-based techniques in real-time, upon verification of the patient and identifying the type of the one or more medical devices;
    determining, by the processor, data displayed on a screen of the one or more medical devices upon analyzing the one or more multimedia using an object detection technique and the second deep learning model;
    generating, by the processor, a coordinate-based representation of each detected element in a form of a tuple

[value, x, y, w, h], wherein the value represents a digit or symbol, the x and y represent pixel coordinates of a location of the digit or symbol on the screen, and the w and h represent a width and a height of a bounding box of the digit or symbol in pixels;

training, by the processor, a third deep learning model with data interpretation-related information using one or more deep learning-based techniques in real-time, upon receiving the coordinate-based representation of the each detected element from the data determination module;

grouping the detected digits into composite values based on spatial positions defined by the pixel coordinates, wherein if a distance between two detected digits is less than one-half of the height h of a smallest detected digit, the two detected digits are treated as a single composite value, and digits not satisfying remain as individual values;

generating updated coordinate-based representations of the composite values by adjusting the bounding boxes to reflect any merging;

arranging the composite values into one or more rows based on their vertical pixel coordinates y;

interpreting the arranged one or more rows as medical data corresponding to one or more health parameters using the third deep learning model, based on at least one of the type of the one or more medical devices; and transferring, by the processor, the medical data to at least one of one or more healthcare providers and one or more preferred recipients based on the medical data transfer request, upon interpretation, thereby digitizing the one or more medical devices at the patient terminal for transferring the medical data.

12. The method of claim 11, comprising detecting, by the processor, a color-coding feature within the one or more medical devices using a color-coding detection technique, when the type identified corresponds to a color coding-related device.

13. The method of claim 11, comprising generating, by the processor, a rectangular box to navigate and focus an area of interest for capturing the data in the one or more multimedia, wherein the area of interest corresponds to the screen of the one or more medical devices.

14. The method of claim 11, comprising generating, by the processor, a medical report personalized to the patient upon transferring the medical data, wherein the medical report comprises information corresponding to the one or more health parameters upon digitization of the medical data.

15. The method of claim 14, comprising generating, by the processor, one or more alerts upon at least one of a detection of a deviation in the one or more health parameters from one or more threshold values, generation of the medical report, and generation of a negative verification result.

16. The method of claim 11, comprising facilitating, by the processor, an interaction between the patient and at least one of the one or more healthcare providers and the one or more preferred recipients, upon receiving an interaction request, upon verification of the identity of the patient.

* * * * *